United States Patent [19]

Nagashima

[11] Patent Number: 5,349,632
[45] Date of Patent: Sep. 20, 1994

[54] CORDLESS TELECOMMUNICATION NETWORK WITH DYNAMICALLY ASSIGNED UNIQUE TIMESLOTS FOR ZONE REGISTRATION POLLING

[75] Inventor: Noriaki Nagashima, Tokyo, Japan

[73] Assignee: NEC Corporation, Tokyo, Japan

[21] Appl. No.: 885,890

[22] Filed: May 20, 1992

[30] Foreign Application Priority Data

May 20, 1991 [JP] Japan .................. 3-115015

[51] Int. Cl.$^5$ .......................... H04M 11/00
[52] U.S. Cl. .................... 379/61; 455/34.1; 455/62
[58] Field of Search ............ 379/58, 59, 61, 63; 455/34.1, 54.1, 56.1, 62, 63

[56] References Cited

U.S. PATENT DOCUMENTS

| | | | |
|---|---|---|---|
| 4,833,702 | 5/1989 | Shitara et al. | 379/60 |
| 5,044,010 | 8/1991 | Frenkiel et al. | 379/61 |
| 5,126,733 | 6/1992 | Sagers et al. | 455/54.1 |
| 5,197,093 | 3/1993 | Knuth | 379/58 |
| 5,263,176 | 11/1993 | Kojima et al. | 455/62 |

FOREIGN PATENT DOCUMENTS 4032322  2/1992  Japan ................................ 455/62

Primary Examiner—Curtis Kuntz
Assistant Examiner—Dwayne D. Bost
Attorney, Agent, or Firm—Sughrue, Mion, Zinn, Macpeak & Seas

[57] ABSTRACT

In a network for serving cordless stations located in microcells, speech channels are divided into channel groups such that no intermodulation products occur among the channels of each group. Base units are located respectively in the microcell sites to establish two-way speech channels with their cordless stations. Each base unit generates and updates priority values of the channel groups as representations of usages of all channels through a statistical process. Depending on the updated priority values different channel groups are uniquely assigned to the base units. Timeslots are defined uniquely by the respective base units using the identifiers of the assigned channel groups for broadcasting zone-registration polling signals during the defined timeslots to elicit a zone registration response from each cordless station.

10 Claims, 7 Drawing Sheets

POLLING DATA FILE

| |
|---|
| POLLING INTERVALS |
| NEXT POLLING TIME |
| OFFSET COUNT VALUE |

30

CHANNEL GROUP FILE

| GROUP NUMBER | SPEECH CHANNEL NUMBER |
|---|---|
| GROUP #1 | #1, #2, #4, #8, #13, #21, #35 |
| GROUP #2 | #3, #5, #6, #10, #12, #20, #32 |
| GROUP #3 | #7, #9, #14, #15, #25, #29, #38 |
| ⋮ | ⋮ |

31

GROUP PRIORITY FILE

| GROUP NUMBER | PRIORITY |
|---|---|
| GROUP #1 | 0.5 |
| GROUP #2 | 0.76 |
| GROUP #3 | 0.64 |
| ⋮ | ⋮ |

32

ASSIGNED GROUP NO. FILE

33

NETWORK DATA FILE

| |
|---|
| SYSTEM IDENTIFIER |
| ZONE IDENTIFIERS |

34

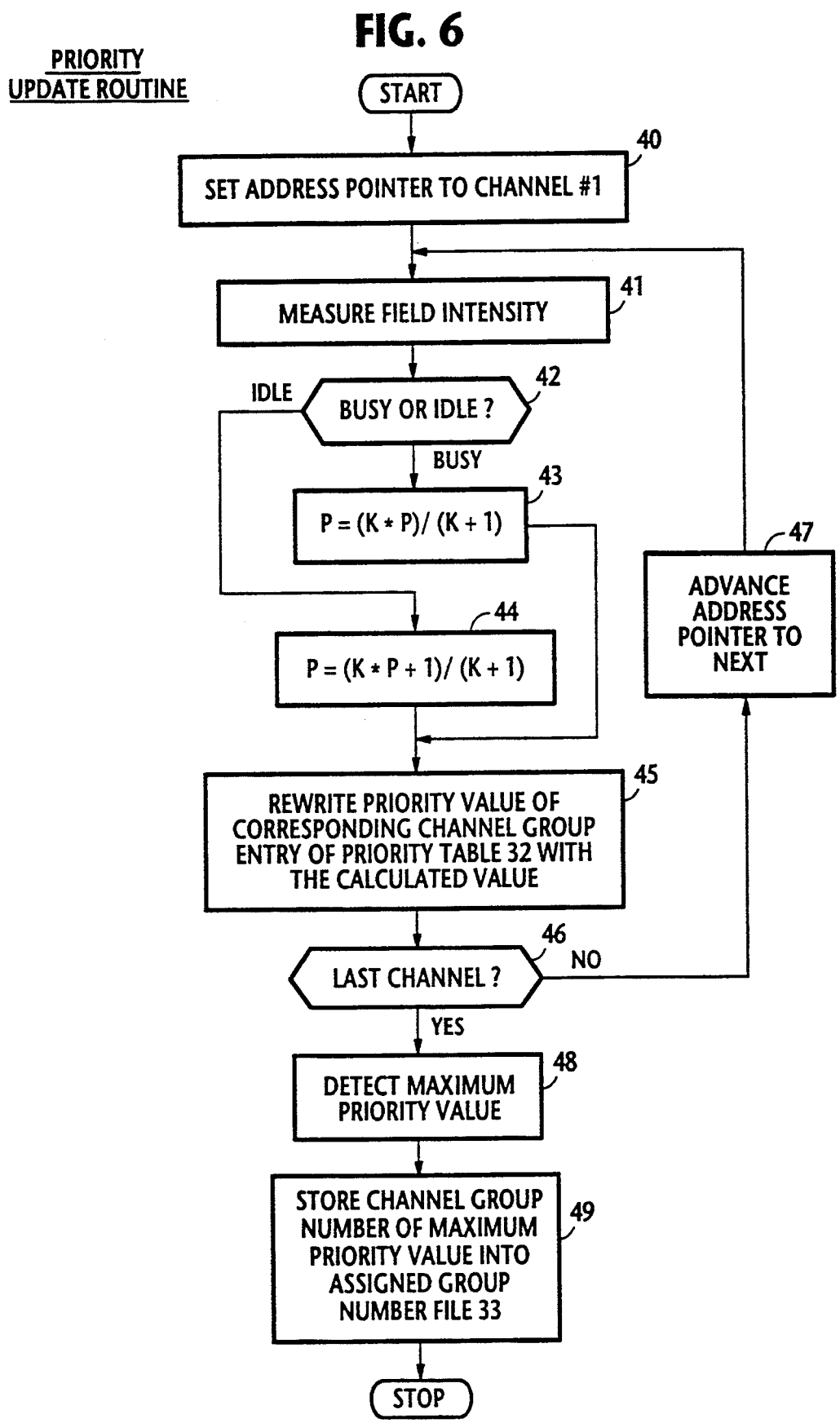

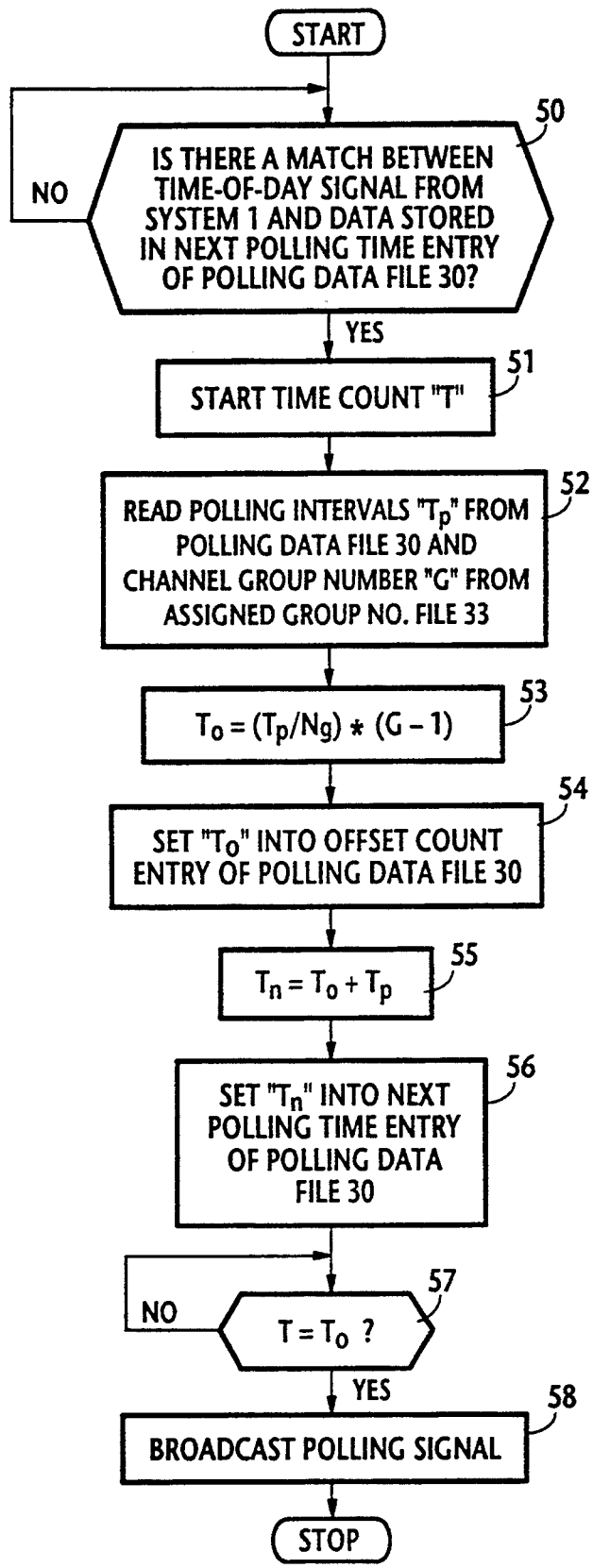

CORDLESS TELECOMMUNICATION NETWORK WITH DYNAMICALLY ASSIGNED UNIQUE TIMESLOTS FOR ZONE REGISTRATION POLLING

BACKGROUND OF THE INVENTION

The present invention relates generally to cordless telephone networks for covering an area which is divided into relatively small zones, or microcells, and more specifically to a technique for polling the cordless telephones of such systems to elicit a zone registration response therefrom.

With cellular cordless or mobile telephone networks, each cordless or mobile station is polled at intervals from each cell site to return a response indicating the identity of the zone in which the station is located. In order to avoid a collision between polling signals from the cell sites, poll timing information is stored in a local switching system, which directs all base units at the cell sites to send respective polling signals at mutually exclusive times. This type of networks has met with wide reception in business environments as it can be easily adapted for changes in corporate organization of floor space. With this type of application, the area covered by the network is partitioned into small zones, or microcells with a diameter of as small as several tens of meters.

However, difficulty arises in precisely setting the poll timing at a single control point such that it is always optimal for changing topologies of business environment.

SUMMARY OF THE INVENTION

It is therefore an object of the present invention to provide a cellular cordless telecommunication network which can be adapted to any topological changes by shifting the burden of polling control to cell sites.

This object is obtained by having the cell sites, or base units control their respective poll timing according to dynamically assigned channel groups.

According to the present invention, there is provided a telecommunication network for serving cordless units located which are of service zones. The network has radio speech channels which are organized into a plurality of channel groups such that no intermodulation products occur among the channels of each group. The network comprises a plurality of base units located respectively in the service zones. Each of the base units establishes a two-way speech channel with those of the cordless units which are located in the same zone as the base unit, and generates priority values of the channel groups as representations of usages of the groups through a statistical process and uniquely assigns one of the channel groups to the base unit according to the priority values. The base unit defines a timeslot depending on the assigned channel group and transmits a polling signal to the cordless units during the defined timeslot to elicit a response therefrom.

In a specific aspect, the base unit periodically performs computations involving an arithmetic division of a value representing a predetermined time interval by the number of the channel groups provided in the network to produce a quotient and a multiplication of the quotient by a value representing the assigned channel group minus one to detect an offset time interval with respect to a reference time. A time lapse from the reference time is measured and a polling signal is sent from the base unit when the measured time lapse equals the offset time interval.

BRIEF DESCRIPTION OF THE DRAWINGS

The present invention will be described in further detail with reference to the accompanying drawings, in which:

FIG. 6 is a flowchart of a channel group priority update routine to be executed by the channel controller of the base unit; and FIG. 7 is a flowchart of a polling routine to be executed by the channel controller.

DETAILED DESCRIPTION

Figure 1:
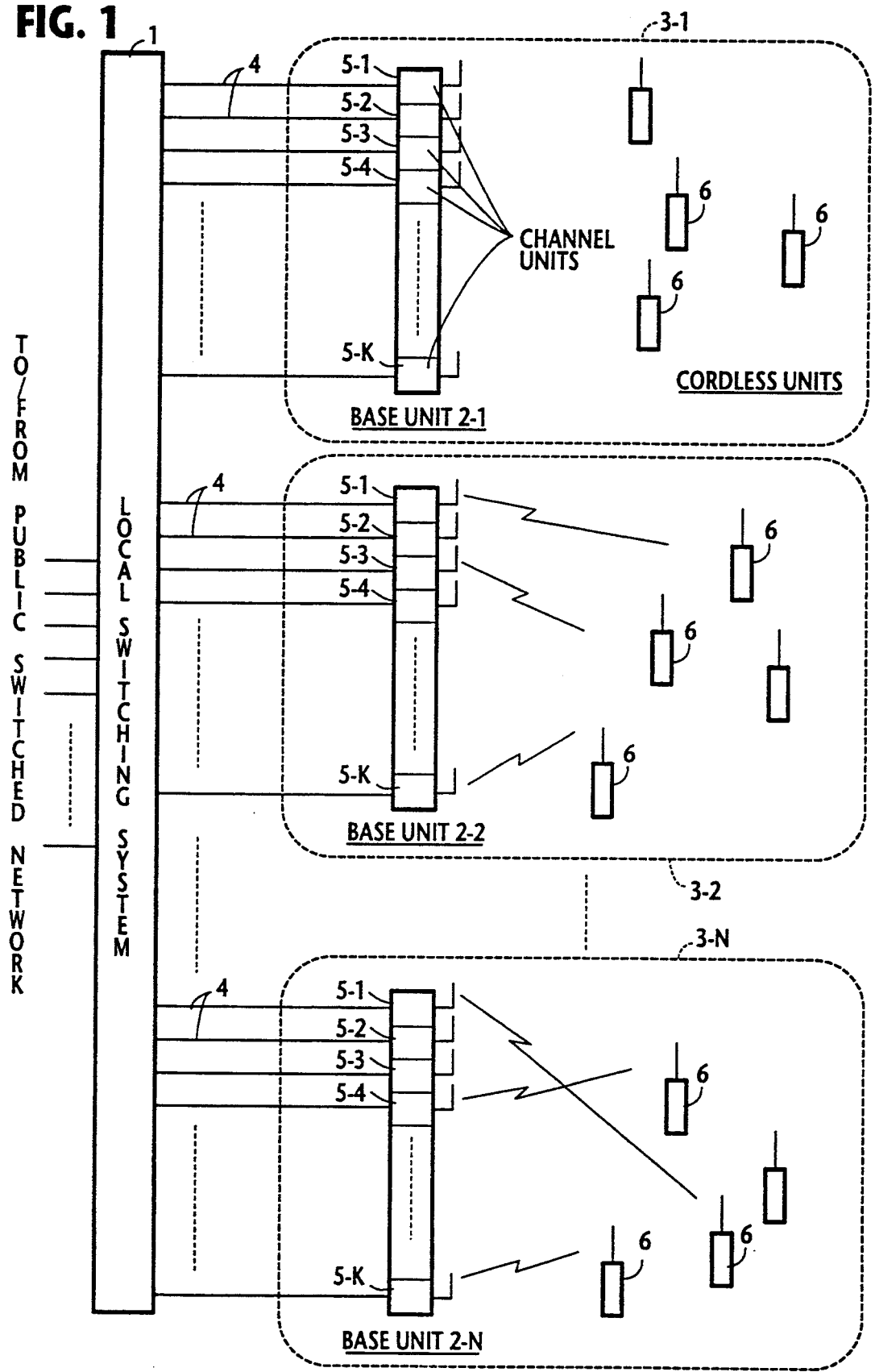
FIG. 1 is a block diagram of a telecommunication network for serving cordless stations located in microcells in which timeslots are dynamically assigned for zone registration polling purposes according to the present invention.

FIG. 1 is a block diagram of a private switched cordless telephone network in which the zone registration polling feature of the present invention is incorporated. In FIG. 1, the system comprises a local switching system 1 such as PBX (private branch exchange) connected through exchange lines to a public switched network, not shown. Connected by extension lines 4 to the local switching system 1 are base unit 2-1-2-N of identical construction which are located in respective service zones 3-1 through 3-N. Each base unit comprises channel units 5-1 through 5-K each being capable of establishing a two-way control channel and a two-way speech channel. For a typical system, speech channels are provided as channels #1 through #49 and a control channel as channel #50. The extension lines from the local switching system 1 are terminated respectively to these channel units. Cordless units 6 are located in each service zone 3. During an idle state, each cordless unit is constantly monitoring the control channel, ready to receive control signals from any of the channel units of the zone in which it is located, to tune to one of the speech channels with frequency division multiplex with other channel units when a call is originated or received. The number of channel units provided for each service zone is dependent on the traffic of the zone.

Speech channels #1 through #49 are organized into several groups so that no intermodulation products occur between the speech channels of the same group as well as between any of the speech channels and the control channel. The channel groups are given priority values which are dynamically altered in a manner to be described, and each service zone is assigned a channel group whose priority value is higher than a previous one.

Figure 2:
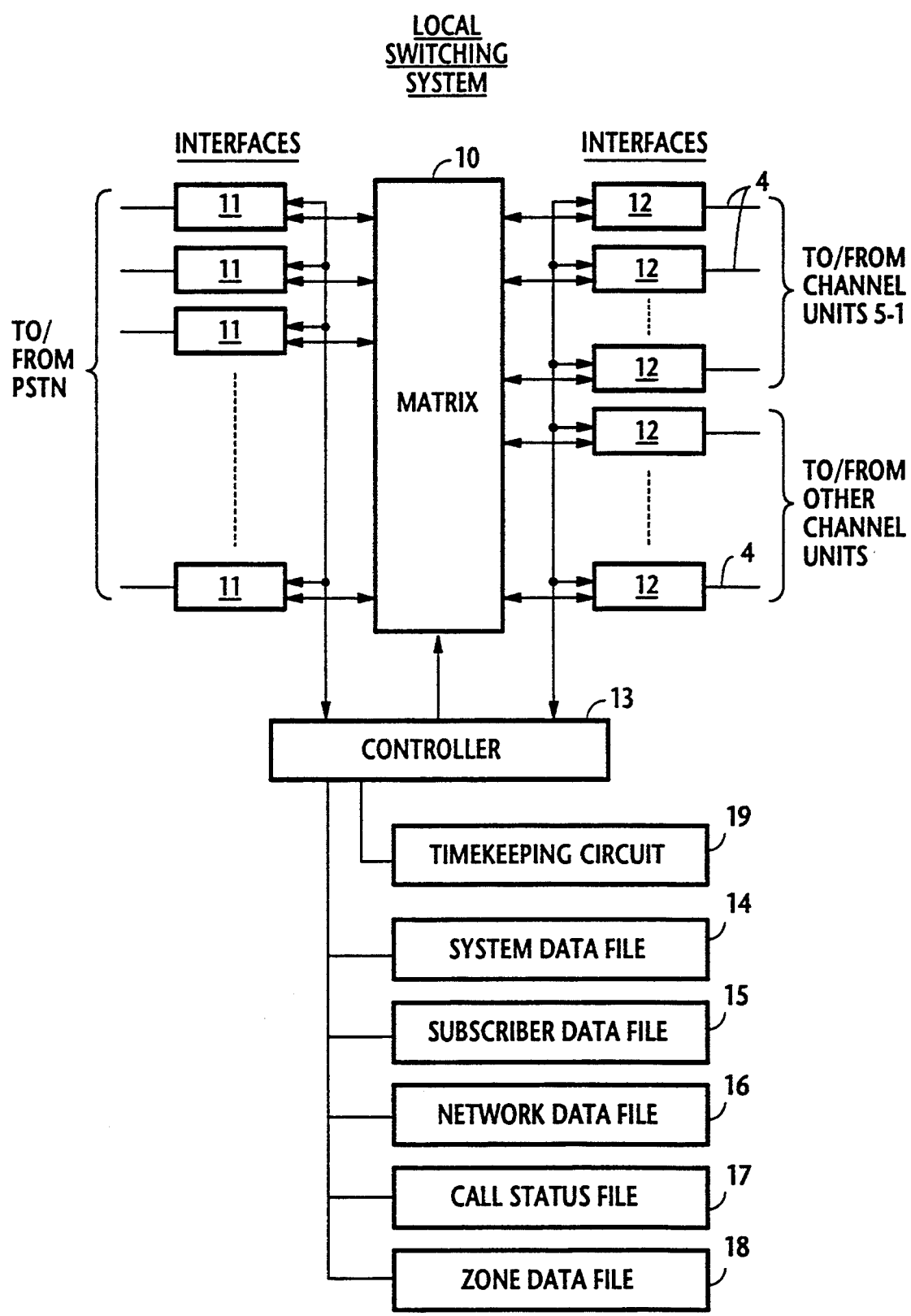
FIG. 2 is a block diagram of the local switching system of FIG. 1.
Figure 3:
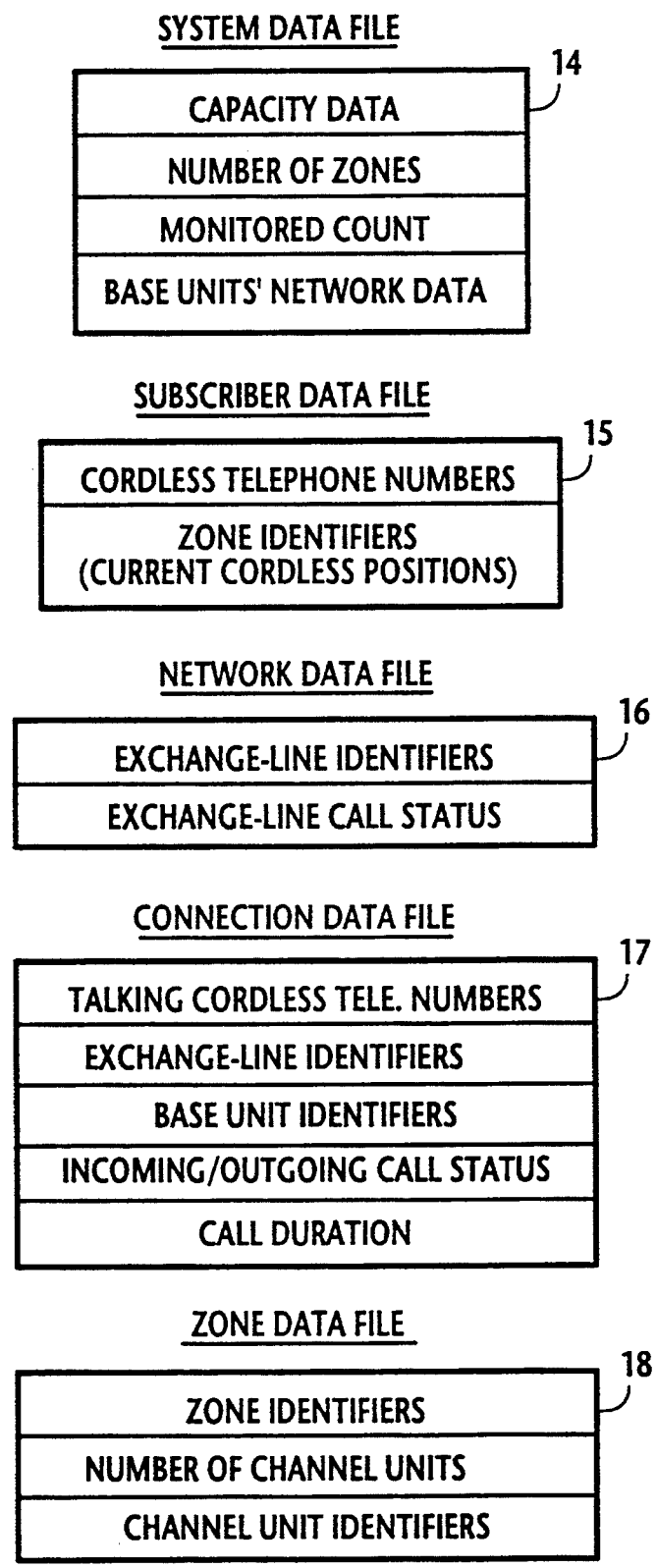
FIG. 3 shows details of the various data files of the local switching system.

As illustrated in FIG. 2, the local switching system 1 comprises a switching matrix 10 which responds to a switching control signal from a controller 13 by setting up a speech path between network interfaces 11, on the one hand, which are coupled to corresponding line terminals of a switching exchange of the public network and local interfaces 12, on the other, which are divided into groups corresponding to base units 2, the local interfaces 12 of each group being connected respectively to the channel units of the base unit 2 corresponding to that group. Controller 13 is associated with the interfaces of both line and local sides of the system for exchanging call processing signals both with the network and base units, and further associated with a memory in which several files are defined, including system data file 14, subscriber data file 15, network data file 16, connection data file 17 and zone data file 18. Specifically, as shown in FIG. 3, system data file 14 holds information on the system capacity (the maximum number of subscribers that can be accommodated), the total number of service zones 3 (equal to the total number of base units 2), monitored timer count value, and network data of the base units. Subscriber data file 15 contains cordless telephone numbers and identifiers of zones in which the cordless units are located. Network data file 16 stores exchange-line identifiers and the call status of the exchange lines. Connection data file 17 relates to information including cordless telephone numbers of subscribers talking over an established communications link, the identifiers of the exchange lines, the identifiers of the base units, incoming/outgoing call status information and call duration data. Zone data file 18 includes zone identifiers, number of channel units and their identifiers. A timekeeping circuit 19 is provided for generating time-of-day data to be supplied to controller 13 for purposes of system's traffic and status management. The time-of-day data is polling at regular intervals from the local switching system to all channel units through lines 4.

Figure 4:
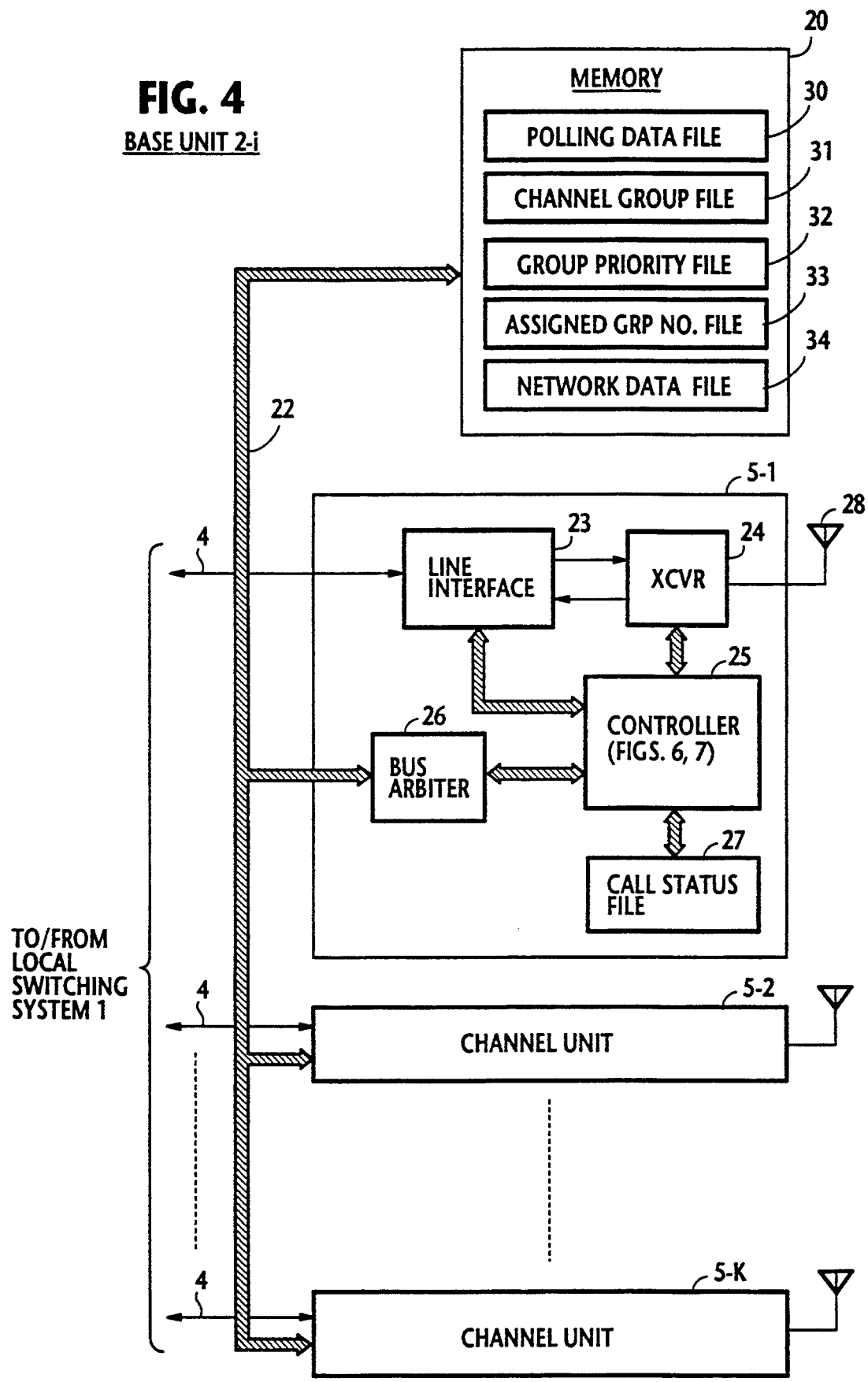
FIG. 4 is a block diagram of a base unit of FIG. 1.

As shown in FIG. 4, each base unit 2-i comprises a memory 20 which is coupled by way of a common bus 22 to the channel units 5-1 through 5-K. Each channel unit 5 includes a line interface 23 that is connected through extension line 4 to the corresponding local interface 12 of switching system 1. A radio-frequency transceiver 24 is coupled to the line interface 23 and to a channel controller 25. Transceiver 24 is normally tuned to the common control channel to receive call processing signals through interface 23 or from cordless units 6 using antenna 28 for setting up a two-way speech channel under control of the channel controller 25. Channel controller 25 cooperates with a call status file 27 as well as with memory 20 via a bus arbiter 26 to control the transceiver 24 during call setup and clearing phases of a connection. Bus arbiter 26 provides arbitration among channel units 5 when more than one channel unit attempts to obtain the right to use the common channel 22.

Figure 5:
FIG. 5 shows details of the various data files of the base unit of FIG. 4.

Memory 20 is partitioned into several files including polling data file 30, channel group file 31, group priority file 32, assigned group number file 33 and network data file 34. As illustrated in FIG. 5, polling data file 30 includes data entries for storing polling intervals, next polling time and offset count value ($T_o$) which will be described later. Channel group file 31 includes data indicating relationships between channel group numbers and identifiers of their corresponding channels. Group priority file 32 indicates group numbers and their priority values which are updated dynamically in a statistical process to be described. Assigned group number file 33 contains a channel group number which is stored therein as a result of the priority update process. The channel group number stored in file 33 is accessed by the channel controller 25 of each channel unit during call setup procedures to select an idle speech channel. Network data file 34 contains a system identifier identifying the cordless switching system to allow it to be distinguished from nearby like systems. This files further contains zone numbers for respectively identifying the service zones of the system.

The controller 25 of each channel unit is programmed to perform a priority update routine and a polling routine illustrated respectively in FIGS. 6 and 7.

In FIG. 6, the update routine is invoked at periodic intervals and begins with step 40 which directs the setting of the address pointer to channel #1. Exit then is to step 41 to measure the field intensity of the channel specified by the address pointer. Control proceeds to decision step 42 to check to see if the measured intensity is higher (i.e., busy) or lower (i.e., idle) than a specified level to determine if that channel is busy or idle. If it is busy, control branches at step 42 to step 43 to calculate the following Equation, $$P_u = (K \times P_s)/(K+1) \qquad (1)$$

where, $P_s$ is a priority value of a channel group stored in group priority file 32 identified by the address pointer $P_u$ is a priority value with which the stored value is to be updated and K a constant which determines an incremental/decremental value of the priority value with respect to the stored value. Typically, a K-value of 128 is used. Control proceeds to step 45 to set the calculated priority value into the corresponding channel-group entry of the priority file 32, rewriting the stored priority value.

If an idle indication is given by the field intensity test, control branches at step 42 to step 44 to calculate the following Equation, $$P_u = (K \times P_s + 1)/(K+1) \qquad (2)$$

and proceeds to step 45 to set the calculated priority value into the corresponding channel-group entry of the priority file 32. The priority value P obtained by Equations (1) and (2) varies in the range between 0 and 1. Note that each result of Equation (1) is greater than the previously stored value and the incremental value of the result becomes smaller as the priority value P approaches unity and becomes greater as it approaches zero, while each result of Equation (2) is smaller than the previously stored and the decremental value of the result becomes greater as priority value P approaches unity and becomes smaller as it approaches zero. If the address pointer is set to channel #1, an initial priority value 0.5 is used to compute Equation (1) if the channel is busy, yielding an updated value of 0.496 or the same priority value is used to compute Equation (2) if the channel is idle, yielding an updated value of 0.504.

Following priority updating step 45, control advances to step 46 to check to see if the test reaches the last channel of the system. If the answer is negative, control branches at step 46 to step 47 to advance the address to the next and returns to step 41 to repeat the process.

In this way, the previous priority value of each channel group is updated with a calculated value subsequently derived from the next channel of the same group, and each entry of the priority file 32 is filled with a value obtained from the most recent calculation.

Since the calculated priority value reflects the previous priority value of the same channel group and the calculation is repeated on all channels of the same group to rewrite the previous value, the final priority value is a result of this statistical process. Therefore, channel assignment is dynamically performed without causing interference between adjacent service zones and without being adversely affected by a time-varying traffic load.

Upon completion of the field intensity test, control branches at step 46 to step 48 to detect a maximum priority value from the group priority file 32. Exit then is to step 49 to store the channel group number of the maximum priority value into the assigned group number file 33. Since the priority value of each channel group increases as its usage decreases, the channel group assignment operates in such a way that any of the channels of the group which is currently used by a given zone is not selected by the adjacent zones, so that any pair of adjacent zones are assigned unique channel groups.

Referring to FIG. 7, the program execution of a polling routine begins with decision step 50 which detects a match between the time-of-day signal transmitted from the switching system 1 with a value stored in the next polling time entry of polling data file 30. When this occurs, control branches to step 51 to start incrementing a time count value "T" with respect to a reference time, i.e., the time of detection of the match, and goes to step 52 to read polling intervals data "$T_p$" from polling data file 30 and a channel group number "G" from assigned group number file 33. Exit then is to step 53 to calculate the following Equation:

$$T_o = (T_p/N_g)(G-1) \quad (3)$$

where, $T_o$ is the offset count value, and $N_g$ represents the maximum number of channel groups of the system. Control exits to step 54 to set the calculated $T_o$-value into the offset count value entry of poling data file 30. Step 55 is then executed by summing the offset count $T_o$ and the polling intervals $T_p$ to obtain a sum $T_n$ which represents the next polling time. In step 56, the sum $T_n$ is tored into the next polling time entry to update its value. When the time count T equals the offset time period $T_o$ (step (57)), a polling signal is generated (step 58) and broadcast from each channel unit 5 to the cordless units. More specifically, the polling signal is formulated by assembling the identifier of the system, a type-of-signal identifier and the identifier of the service zone.

If the number of channel groups is 12, the interval between successive polling signals is 2 minutes and the channel group number is 190 5, for example, then the timeout period expires at the start of the fifth interval during which the polling signal is sent. Therefore, the time scale of the system is divided into as many timeslots as there are channel groups (i.e., service zones) and each base unit transmits its polling signal at unique timeslot which is dynamically determined as described above. Thus, no collision occurs between polling signals transmitted from different base units.

On receiving the polling signal, each cordless unit returns a position registration signal by containing in it the station's identifier, a type-of-signal identifier and the identifier of the zone in which it is located.

The base unit receives the zone registration signal from each cordless station, examines, its zone identifier field and updates the zone identifier entry of the subscriber data file 15. During a call setup phase, each base unit references the updated subscriber data file 15 to establish a connection in a known manner.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A telecommunication network for serving cordless units located in a plurality of service zones, said network having radio speech channels which are organized into a plurality of channel groups such that no intermodulation products occur among the channels of each group, said network comprising a plurality of base units located respectively in said service zones, each of said base units comprising:
    means for establishing two-way speech channels with those of the cordless units which are located in the same zone as the base units;
    means for generating priority values of said channel groups as representations of usages of said groups through a statistical process and uniquely assigning one of said channel groups to the base units according to said priority values; and
    means for defining a timeslot depending on the assigned channel group and transmitting a polling signal from the base units during the defined timeslot to elicit a response from the cordless units located in the same zone as the base units.

2. A telecommunication network as claimed in claim 1, wherein said means for defining a timeslot comprises:
    means for detecting a reference time;
    means responsive to the detection of said reference time for dividing a value representing a predetermined time interval by a maximum number of said channel groups to produce a quotient, and multiplying the quotient by a value representing the assigned channel group minus one to detect and offset time interval with respect to said detected reference time; and
    means for measuring a time lapse from said reference time and transmitting said polling signal when the measured time lapse equals said offset time interval.

3. A telecommunication network as claimed in claim 1, wherein said means for defining a timeslot comprises:
    a polling data file storing a next polling time therein;
    means for detecting a match between a reference time and said next polling time;
    means responsive to the detection of a match by said match detecting means for dividing a value representing a predetermined time interval by a maximum number of said channel groups to produce a quotient, and multiplying the quotient by a value representing the assigned channel group minus one to detect said offset time interval with respect to said detected reference time;
    means for summing said reference time and said offset time interval to derive a subsequent polling time and rewriting the stored next polling time with said derived polling time; and
    means for measuring a time lapse from said reference time and transmitting said polling signal when the measured time lapse equals said offset time interval.

4. A telecommunication network as claimed in claim 1, wherein said priority value generating means comprises:

a priority file having entries corresponding respectively to said channel groups, said priority file storing priority values of said channel groups respectively in said corresponding entries;

means for measuring field intensity of each of said radio channels and increasing the stored priority value of the channel group to which the radio channel belongs if the measured field intensity is higher than a specified value and decreasing said stored priority value of the channel group if the measured field intensity is lower than said specified value; and means for detecting a maximum value of said priority values stored in said priority file and reassigning one of said channel groups having said maximum value to a base unit instead of the channel group currently assigned to the base unit.

5. A telecommunication network as claimed in claim 1, further comprising a local switching system connected to a public switched telecommunications network, wherein said base units are connected to said local switching system.

6. In a telecommunication network for serving cordless units located in a plurality of service zones, said network having radio speech channels which are organized into a plurality of channel groups such that no intermodulation products occur among the channels of each group, said network comprising a plurality of base units located respectively in said service zones, each of said base units comprising means for establishing two-way speech channels with those of the cordless units which are located in the same zone as the base units a method for polling the cordless units from each of said base units comprising the steps of:

a) generating priority values of said channel groups as representations of usages of said groups through a statistical process;

b) uniquely assigning one of said channel groups to the base units according to said priority values;

c) defining a timeslot depending on the assigned channel group; and d) transmitting a polling signal from the base units during the defined timeslot to elicit a response from the cordless units located in the same zone as the base units.

7. A method as claimed in claim 6, wherein the step (d) comprises the steps of:

$d_1$) detecting a reference time;

$d_2$) measuring a time lapse from said reference time;

$d_3$) dividing a value representing a predetermined time interval by a maximum number of said channel groups to produce a quotient, and multiplying the quotient by a value representing the assigned channel group minus one to detect said offset time interval with respect to said detected reference time; and $d_4$) detecting when the measured time lapse equals said offset time interval to transmit said polling signal.

8. A method as claimed in claim 6, wherein the step (d) comprises the steps of:

$d_1$) storing a value representing a next polling time in a memory;

$d_2$) detecting a match between a reference time and said next polling time;

$d_3$) measuring a time lapse from said reference time in response to the detection of a match by the step ($d_2$);

$d_4$) dividing a value representing a predetermined time interval by a maximum number of said channel groups to produce a quotient, and multiplying the quotient by a value representing the assigned channel group minus one to detect said offset time interval with respect to said detected reference time;

$d_5$) summing said reference time and said offset time interval to derive a subsequent polling time and rewriting the value stored in said memory with said derived polling time as said next polling time;

$d_6$) detecting when the measured time lapse equals said offset time interval to transmit said polling signal; and $d_7$) repeating the steps ($d_2$) to ($d_6$).

9. A method as claimed in claim 6, wherein each of the base unit includes a priority file having entries corresponding respectively to said channel groups, said priority file storing priority values of said channel groups respectively in said corresponding entries, wherein the step (a) comprises:

$a_1$) measuring field intensity of each of said radio channels;

$a_2$) increasing the stored priority value of the channel group to which the radio channel belongs if the measured field intensity is higher than a specified value and decreasing said stored priority value of the channel group if the measured field intensity is lower than said specified value;

$a_3$) detecting a maximum value of said priority values stored in said priority file; and $a_4$) reassigning one of said channel groups having said maximum value to the base unit instead of a channel group currently assigned to the base unit, wherein the step (d) comprises the steps of:

$d_1$) detecting a reference time;

$d_2$) measuring a time lapse from said reference time;

$d_3$) dividing a value representing a predetermined time interval by a maximum number of said channel groups to produce a quotient, and multiplying the quotient by a value representing the channel group reassigned by the step ($a_4$) minus one to detect said offset time interval with respect to said reference time; and $d_4$) detecting when the measured time lapse equals said offset time interval to transmit said polling signal.

10. A method as claimed in claim 6, wherein each of the base unit includes a priority file having entries corresponding respectively to said channel groups, said priority file storing priority values of said channel groups respectively in said corresponding entries, and a polling data file, wherein the step (a) comprises:

$a_1$) measuring field intensity of each of said radio channels;

$a_2$) increasing the stored priority value of the channel group to which the radio channel belongs if the measured field intensity is higher than a specified value and decreasing said stored priority value of the channel group if the measured field intensity is lower than said specified value;

$a_3$) detecting a maximum value of said priority values stored in said priority file; and $a_4$) reassigning one of said channel groups having said maximum value to the base unit instead of a channel group currently assigned to the base unit, wherein the step (d) comprises the steps of:

$d_1$) storing a value representing a next polling time in said polling data file;

$d_2$) detecting a match between a reference time and said next polling time;

$d_3$) measuring a time lapse from said reference time in response to the detection of a match by the step ($d_2$);

$d_4$) dividing a value representing a predetermined time interval by a maximum number of said channel groups to produce a quotient, and multiplying the quotient by a value representing the channel group reassigned by the step ($a_4$) minus one to detect said offset time interval with respect to said detected reference time;

$d_5$) summing said reference time and said offset time interval to derive a subsequent polling time and rewriting the value stored in said polling data file with said derived polling time to represent said next polling time;

$d_6$) detecting when the measured time lapse equals said offset time interval to transmit said polling signal; and $d_7$) repeating the steps ($d_2$) to ($d_6$).

* * * * *

UNITED STATES PATENT AND TRADEMARK OFFICE
CERTIFICATE OF CORRECTION

PATENT NO. : 5,349,632
DATED : September 20, 1994
INVENTOR(S) : Noriaki NAGASHIMA It is certified that error appears in the above-identified patent and that said Letters Patent is hereby corrected as shown below:

Column 5, line 51, delete "190 5" and insert --# 5--.

Signed and Sealed this

Twenty-seventh Day of June, 1995

Attest:

BRUCE LEHMAN

*Attesting Officer*   Commissioner of Patents and Trademarks